US010992779B2

(12) United States Patent
Beach et al.

(10) Patent No.: US 10,992,779 B2
(45) Date of Patent: *Apr. 27, 2021

(54) LIMITING ALERTS ON A COMPUTING DEVICE

(71) Applicant: Google LLC, Mountain View, CA (US)

(72) Inventors: Nathan Dickerson Beach, Somerville, MA (US); Daniel George Koulomzin, Jamaica Plain, MA (US); Brett Lider, San Francisco, CA (US); Tomer Amarilio, Palo Alto, CA (US); Alok Chandel, Sunnyvale, CA (US); Jeffrey Hoefs, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,159

(22) Filed: Sep. 24, 2019

(65) Prior Publication Data

US 2020/0021667 A1 Jan. 16, 2020

Related U.S. Application Data

(63) Continuation of application No. 15/178,420, filed on Jun. 9, 2016, now Pat. No. 10,447,810.

(51) Int. Cl.
*H04L 29/08* (2006.01)
*H04L 12/58* (2006.01)
*G06Q 10/10* (2012.01)

(52) U.S. Cl.
CPC .......... *H04L 67/327* (2013.01); *G06Q 10/10* (2013.01); *G06Q 10/107* (2013.01); *H04L 51/12* (2013.01);

(Continued)

(58) Field of Classification Search
None
See application file for complete search history.

(56) References Cited

U.S. PATENT DOCUMENTS 6,208,996 B1    3/2001  Ben-Shachar et al.
8,576,828 B1 *  11/2013 Massey, Jr. ............. H04M 3/02
                                               370/349

(Continued)

FOREIGN PATENT DOCUMENTS

WO          90/10359 A1     9/1990
WO     WO-9010359 A1 *      9/1990   .......... H04W 88/022

OTHER PUBLICATIONS

Examination Report from counterpart European Application No. 16826868.8, dated Nov. 18, 2019, 7 pp.

(Continued)

*Primary Examiner* — Uzma Alam
(74) *Attorney, Agent, or Firm* — Shumaker & Sieffert, P.A.

(57) ABSTRACT

A computing device is described that receives, at a first particular time, first notification data. Responsive to receiving the first notification data, the computing device outputs, at a first intensity level, a first alert associated with the first notification data. The computing device receives, at a second particular time after the first particular time, second notification data. Responsive to the computing device receiving an indication of user interaction with the computing device between the first particular time and the second particular time, the computing device outputs, at the first intensity level, a second alert associated with the second notification data. Conversely, responsive to the computing device not receiving the indication of user interaction with the computing device, the computing device either outputs, at a second intensity level that is less than the first intensity level, (Continued)

the second alert, or refrains from outputting the second alert entirely.

20 Claims, 5 Drawing Sheets

(52) U.S. Cl.
CPC .............. *H04L 51/24* (2013.01); *H04L 51/26* (2013.01); *H04L 67/26* (2013.01)

(56) References Cited

U.S. PATENT DOCUMENTS

| | | | |
|---|---|---|---|
| 8,941,500 | B1 | 1/2015 | Faaborg et al. |
| 9,641,537 | B2* | 5/2017 | Cohen ..................... H04L 9/321 |
| 2002/0087649 | A1 | 7/2002 | Horvitz |
| 2004/0254998 | A1 | 12/2004 | Horvitz |
| 2006/0223547 | A1 | 10/2006 | Chin et al. |
| 2007/0121920 | A1* | 5/2007 | Silver ................... H04M 1/663 379/376.02 |
| 2012/0252416 | A1* | 10/2012 | Kissinger ............ H04M 19/047 455/412.2 |
| 2012/0295645 | A1* | 11/2012 | Yariv ...................... H04W 4/12 455/466 |
| 2013/0331067 | A1 | 12/2013 | Coussemaeker et al. |
| 2014/0141816 | A1 | 5/2014 | Winkler |
| 2015/0269009 | A1* | 9/2015 | Faaborg ............... A61B 5/6898 719/315 |
| 2015/0371516 | A1 | 12/2015 | Petersen et al. |
| 2016/0155426 | A1 | 6/2016 | Gunn et al. |
| 2016/0187856 | A1* | 6/2016 | Vilermo ............... A61B 5/0816 340/575 |
| 2017/0083165 | A1* | 3/2017 | Ali ........................ G06F 3/0481 |
| 2017/0094484 | A1* | 3/2017 | Li .......................... H04H 60/52 |
| 2017/0116195 | A1* | 4/2017 | Ratiu ...................... H04L 51/32 |
| 2017/0118159 | A1* | 4/2017 | Ratiu ...................... H04L 67/22 |
| 2017/0118304 | A1* | 4/2017 | Ratiu ...................... H04L 67/26 |
| 2017/0134516 | A1* | 5/2017 | Gutman .................. H04W 4/21 |
| 2017/0164167 | A1* | 6/2017 | Li ..................... H04M 3/42042 |
| 2017/0359437 | A1 | 12/2017 | Beach et al. |

OTHER PUBLICATIONS

Response to Examination Report from counterpart European Application No. 16826868.8, dated Nov. 18, 2019, filed Mar. 6, 2020, 3 pp.
International Search Report and Written Opinion of the International Application No. PCT/US2016/068953, dated Mar. 14, 2017, 14 pp.
International Preliminary Report on Patentability from counterpart International Application No. PCT/US2016/068953, dated Dec. 20, 2018, 8 pp.
Response to communication under Rules 161(1) and 162 EPC dated Jan. 18, 2019, from counterpart European Application No. 16826868.8, filed Jun. 28, 2019, 3 pp.
Prosecution History from U.S. Appl. No. 15/178,420, dated Feb. 22, 2018 through Jun. 5, 2019, 77 pp.
First Examination Report from counterpart Indian Patent Application No. 201847035463, dated Jan. 15, 2021, 14 pp.
Response to First Examination Report from counterpart Indian Patent Application No. 201847035463, dated Jan. 15, 2021, filed Feb. 12, 2021, 19 pp.

* cited by examiner

LIMITING ALERTS ON A COMPUTING DEVICE

This application is a continuation of U.S. application Ser. No. 15/178,420 filed Jun. 9, 2016, the entire content of which is hereby incorporated by reference.

BACKGROUND

A computing device may output a notification alert indicative of the receipt of new notification data each time that new notification data is received. For example, a computing device may output an audible, visual, or haptic type alert each time the device receives a new communication or other type of notification data. Due to the high volume and frequency with which some computing devices receive notification data, a computing device that simply outputs a notification alert each time it receives new notification data can be overwhelming, distracting, and/or annoying to some users.

SUMMARY

In general, a computing device is described that receives, at a first particular time, first notification data. Responsive to receiving the first notification data, the computing device outputs, at a first intensity level, a first alert associated with the first notification data. The computing device receives, at a second particular time after the first particular time, second notification data. Responsive to the computing device receiving an indication of user interaction with the computing device between the first particular time and the second particular time, the computing device outputs, at the first intensity level, a second alert associated with the second notification data. Conversely, responsive to the computing device not receiving the indication of user interaction with the computing device, the computing device either outputs, at a second intensity level that is less than the first intensity level, the second alert, or refrains from outputting the second alert entirely.

In one example, the disclosure is directed to a method that includes receiving, by a computing device, at a first particular time, first notification data. The method further includes responsive to receiving the first notification data, outputting, by the computing device, at a first intensity level, a first alert associated with the first notification data. The method further includes receiving, by the computing device, at a second particular time after the first particular time, second notification data. The method further includes responsive to receiving, by the computing device, an indication of user interaction with the computing device between the first particular time and the second particular time, outputting, by the computing device, at the first intensity level, a second alert associated with the second notification data. The method further includes responsive to not receiving, by the computing device, the indication of user interaction with the computing device between the first particular time and the second particular time, outputting, by the computing device, at a second intensity level that is less than the first intensity level, the second alert associated with the second notification data.

In another example, the disclosure is directed to a method that includes receiving, by a computing device, at a first particular time, first notification data. The method further includes responsive to receiving the first notification data, outputting, by the computing device, a first alert associated with the first notification data. The method further includes receiving, by the computing device, at a second particular time after the first particular time, second notification data. The method further includes responsive to receiving, by the computing device, an indication of user interaction with the computing device between the first particular time and the second particular time, outputting, by the computing device, a second alert associated with the second notification data. The method further includes responsive to not receiving, by the computing device, the indication of user interaction with the computing device between the first particular time and the second particular time, refraining, by the computing device, from outputting the second alert.

In another example, the disclosure is directed to a computing system comprising at least one processor and at least one module. The at least one module is operable by the at least one processor to receive at a first particular time, first notification data. The at least one module is further operable by the at least one processor to, responsive to receiving the first notification data, output at a first intensity level, a first alert associated with the first notification data. The at least one module is further operable by the at least one processor to receive, at a second particular time after the first particular time, second notification data. The at least one module is further operable by the at least one processor to, responsive to receiving an indication of user interaction with the computing device between the first particular time and the second particular time, output, at the first intensity level, a second alert associated with the second notification data. The at least one module is further operable by the at least one processor to, responsive to not receiving the indication of user interaction with the computing device between the first particular time and the second particular time, output, at a second intensity level that is less than the first intensity level, the second alert associated with the second notification data.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
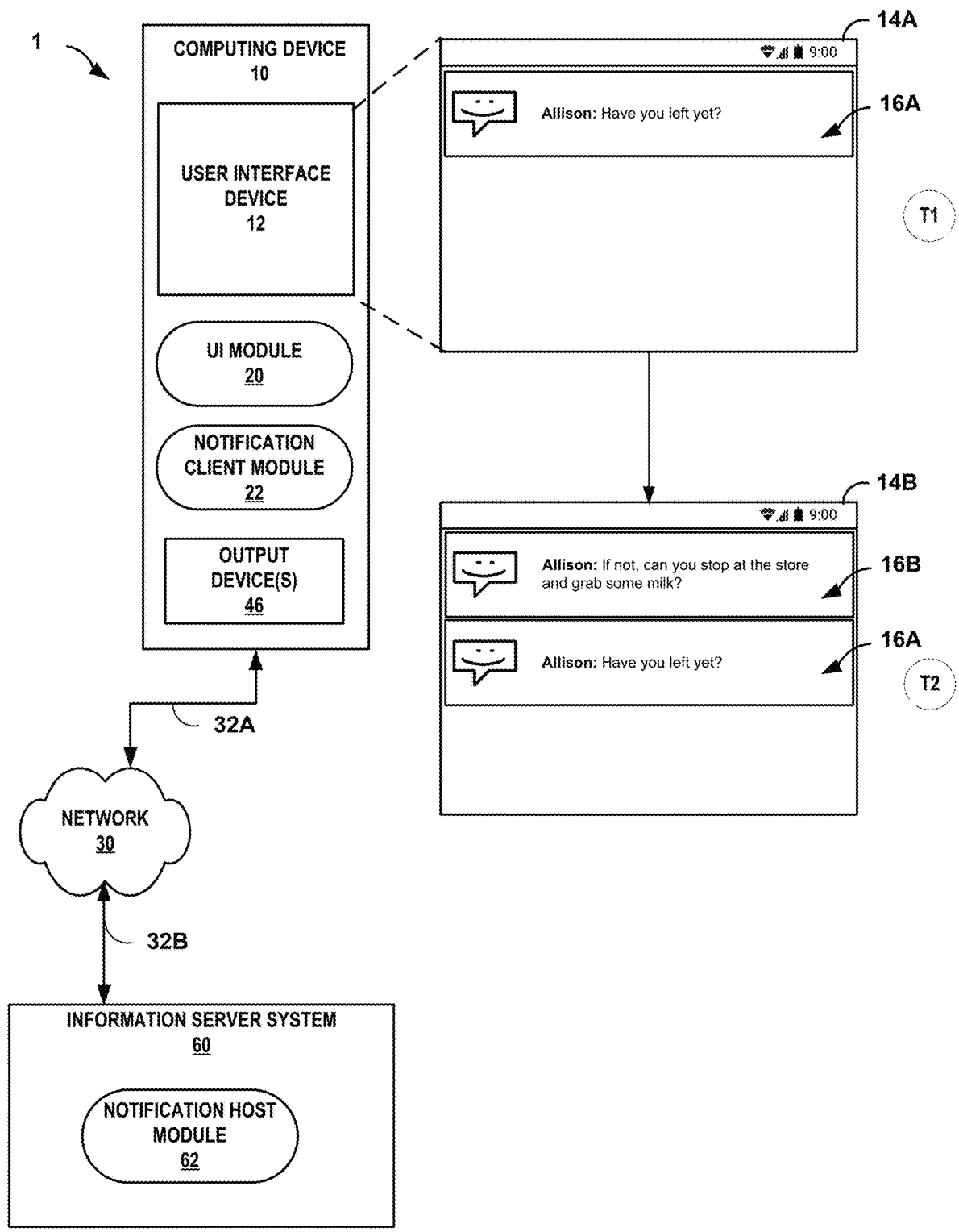
FIG. 1 is a conceptual diagram illustrating an example computing system configured to output alerts associated with notification data based at least in part on user interactions with an example computing device, in accordance with one or more aspects of the present disclosure.

In general, techniques of this disclosure may enable a computing device to determine whether to output an alert (e.g., an audible alert, a visual alert, or a tactile alert) associated with notification data based on whether a user has interacted with the computing device since before receiving the current notification data and after receiving previous notification data or, in some examples, after an alert based on the previous notification data has been output. For example, a computing device may receive notification data from a notification service executing at or accessible by the computing device. The notification data may represent information (a communication message, an alarm, a reminder, etc.) that may be of importance to a user associated with the computing device. Rather than output an alert for each instance of notification data that is received by the computing device, the computing device may instead "rate limit" notification alerts. The computing device may determine if the user has interacted with the computing device since the last notification data was received, and if the user has not interacted with the computing device since the last notification data was received, the computing device may either refrain from outputting or at least output at a lower intensity, an alert associated with newly received notification data.

For instance, the computing device may receive a new text message and in response, output an alert to notify a user that the new text message was received. If the computing device determines that the user has not interacted with the computing device (e.g., by failing to detect the user picking up the device, by failing to detect the user gazing at a display, etc.) since receiving the new text message, the computing device may determine that the user, although potentially aware that a new text message was received, may be busy preforming other tasks and may not have had a chance to view the new text message. As such, if the computing device receives a subsequent text message before the device detects user interactions, the computing device may either refrain from outputting, or at least output at a lower intensity, an alert associated with the subsequent text message.

Similarly, a device other than the computing device, such as a server that handles the delivery of the notification data, may determine the intensity at which to output alerts. For instance, the computing device may upload the notifications to be analyzed by a server, and the server may return alerting instructions to the computing device. Alternatively, some architectures may centralize all notification data through a server component, and then push the notification data from the server to the computing device. In such an example, the server may also send alerting instructions which could be followed exactly or modified and executed by the computing device.

Techniques of this disclosure may utilize other arbitrary rules in addition to user input detection when determining how to output alerts for incoming notification data. For instance, the alerts for incoming notification data may be output at the original, full intensity after a certain amount of time has passed or after a certain number of notifications have been received. In other examples, while the intensity may be decreased for subsequent alerts, the alert itself may be altered to indicate how many missed notifications have been received (i.e., vibrate twice upon receiving a second instance of notification data, vibrate three times upon receiving a third instance of notification data, etc.).

In this manner, the computing device may alert a user of the computing device of the receipt of new notification data without overwhelming, distracting, or annoying the user by unnecessarily outputting an alert each time that new notification data is received. By selectively outputting alerts based on user interactions in this way, the computing device may output fewer alerts by only outputting alerts that are likely to be necessary to gain the attention of a user as opposed to universally outputting alerts each time notification data is received. Responsive to outputting fewer alerts, the computing device may receive fewer inputs from a user interacting with the computing device (e.g., to silence or otherwise inhibit frequent and/or numerous alerts) and may perform fewer operations (e.g., the output of the audio or visual alert or the vibration of the computing device), thereby consuming less electrical power.

Throughout the disclosure, examples are described where a computing device and/or a computing system may analyze information (e.g., locations, speeds, the content of the user interface, incoming messages, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a conceptual diagram illustrating an example computing system 1 that configured to output alerts associated with notification data based at least in part on the user interactions with an example computing device 10, in accordance with one or more aspects of the present disclosure. Computing system 1 of FIG. 1 is an example computing system that includes computing device 10, information server system 60, and network 30.

Network 30 represents any public or private communication network, for instance, a cellular, Wi-Fi, and/or other type of network for transmitting data between computing devices. Computing device 10 and information server system 60 may send and receive data across network 30 using any suitable communication techniques. For example, computing device 10 may be operatively coupled to network 30 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mobile phones, tablet computers, mainframes, servers, cloud computing systems, etc. capable of sending and receiving information across network link 32B to network 30. In some examples, information server system represents a host server for a notification system service. One or more computing devices, such as computing device 10, may access a notification service hosted by information server system 60 for transmitting and/or receiving notification data between platforms, applications, and services executing at the one or more computing devices. In some examples, information server system 60 represents a cloud computing system that provides notification services through network 30 to one or more computing devices, such as computing device 10, that access the notification services via access to the cloud provided by information server system 60. For example, information server system 60 may be a mobile phone and computing device 10 may be a smart watch device operably connected to information server system 60. The mobile phone (i.e., information server system 60) may receive notification data from an outside server or network. Upon receiving the notification data, the mobile phone may forward the notification data to the smart watch device (i.e., computing device 10) via network 30, which may be a short-link radio connection for the purposes of this example.

In the example of FIG. 1, information server system 60 includes notification host module 62. Notification host module 62 may perform operations described using software, hardware, firmware, or a mixture of hardware, software, and firmware residing in and/or executing at information server system 60. Information server system 60 may execute notification host module 62 with multiple processors or multiple devices. Information server system 60 may execute notification host module 62 as a virtual machine executing on underlying hardware. Notification host module 62 may execute as a service of an operating system or computing platform. Notification host module 62 may execute as one or more executable programs at an application layer of a computing platform.

Notification host module 62 may perform functions for routing notification data between one or more computing devices, such as computing device 10, over network 30. For example, notification host module 62 may perform functions for hosting a notification service and outputting notification data associated with platforms, applications, and/or services executing at computing device 10. For example, notification host module 62 may receive notification data indicative of an event associated with an e-mail message account (e.g., a new message received) associated with computing device 10 and send the notification data across network 30 to computing device 10. Computing device 10 may receive the notification data from notification host module 62 of information server system 60 via network link 32B and provide an alert at computing device 10 to indicate the receipt of the notification data.

In the example of FIG. 1, computing device 10 is a mobile computing device (e.g., a mobile phone). However, in other examples, computing device 10 may be a tablet computer, a personal digital assistant (PDA), a laptop computer, a gaming system, a media player, an e-book reader, a television platform, an automobile navigation system, a wearable computing device (e.g., a computerized watch, computerized eyewear, a computerized glove), or any other type of mobile or non-mobile computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces of components of a computing platform, operating system, applications, or services executing at or accessible by computing device 10 (e.g., an electronic message application, an Internet browser application, a mobile operating system, etc.). A user may interact with a respective user interface to cause computing device 10 to perform operations relating to a function.

Computing device 10 may include one or more output devices 46 of computing device 10 may generate output. Examples of output are tactile, audible, and visual output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

Computing device 10 may include user interface ("UP") module 20, and notification client module 22. Modules 20 and 22 may perform operations described using software, hardware, firmware, or a mixture of hardware, software, and firmware residing in and/or executing at computing device 10. Computing device 10 may execute modules 20 and 22 with one or more processors. Computing device 10 may execute modules 20 and 22 as a virtual machine executing on underlying hardware. Modules 20 and 22 may execute as a service or component of an operating system or computing platform. Modules 20 and 22 may execute as one or more executable programs at an application layer of a computing platform. UID 12 and modules 20 and 22 may be otherwise arranged remotely to and remotely accessible to computing device 10, for instance, as one or more network services operating at network 30 in a network cloud.

Notification client module 22 may perform functions associated with receiving, managing, and otherwise handling at least a portion of the notification data generated and/or received by platforms, applications, and services executing at computing device 10. Notification client module 22 may cause UI module 20 to output an alert (e.g., an audible alert, a visual alert, a vibration, etc.) to indicate the receipt of the notification data by computing device 10.

Notification client module 22 may receive notification data from information server system 60 and output the received notification data to a recipient platform, application, and/or service executing at computing device 10. Notification client module 22 may receive notification data generated by a platform, application, and/or service executing at computing device 10 and output the received notification data to information server system 60. Notification client module 22 may further receive notification data generated by one component of a platform, application, and/or service executing at computing device 10 and output the received notification data to a different component of a platform, application, and/or service executing at computing device 10.

As used throughout the disclosure, the term "notification data" is used to describe various types of information that may indicate the occurrence of an event associated with various platforms, applications, and services executing within an execution environment at one or more computing devices, such as computing device 10. For example, notification data may include, but is not limited to, information specifying an event such as: the receipt of a communication message (e.g., e-mail, instant message, SMS, etc.) by a messaging account associated with a computing device, the receipt of information by a social networking account associated with computing device 10, a reminder of a calendar event (meetings, appointments, etc.) associated with a calendar account of computer device 10, information generated and/or received by a third-party application executing at computing device 10, the transmittal and/or receipt of inter-component communications between two or more components of platforms, applications, and/or services executing at computing device 10, etc.

Notification client module 22 may handle notification data as computing device 10 receives the notification data from information server system 60. For instance, computing device 10 may include a notification queue for processing notification data. Notification client module 22 may place the received notification data into the notification queue. UI module 20, which may also have access to the notification queue, may analyze the notification data in the notification queue and determine whether to output alerts associated with the received notification data and/or at what intensity to output alerts associated with the received notification data.

UI module 20 may cause UID 12 to output user interface 14 or another example user interface, for display and, as a user of computing device 10 interacts with user interface presented at UID 12, UI module 20 may interpret inputs detected at UID 12 (e.g., as a user provides one or more gestures at a location of UID 12 at which user interface 14 or another example user interface is displayed). UI module 20 may relay information about the inputs detected at UID 12 to one or more associated platforms, operating systems, applications, and/or services executing at computing device 10 to cause computing device 10 to perform a function.

UI module 20 may receive information and instructions from one or more associated platforms, operating systems, applications, and/or services executing at computing device 10 (e.g., notification client module 22) for generating user interfaces 14A and 14B (collectively, user interface 14). In addition, UI module 20 may act as an intermediary between the one or more associated platforms, operating systems, applications, and/or services executing at computing device 10 and various output devices of computing device 10 (e.g., speakers, LED indicators, vibrators, etc.) to produce output (e.g., graphical, audible, hepatic, etc.) with computing device 10.

For instance, user interface 14 is one example graphical user interface for presenting one or more graphical indications of notification data received by computing device 10. User interface 14 includes graphical indications 16A-16B (collectively referred to herein as "graphical indications 16"). Each of graphical indications 16 corresponds to an alert being outputted by computing device 10 in response to notification data received at computing device 10. In the example of FIG. 1, graphical indications 16 represents visual alert indicative of the receipt of notification data associated with respective text messages from the same contact in the computing device's address book (i.e., Allison).

UI module 20 may ultimately control when and how (e.g., in what form) notification alerts are output to a user. UI module 20 may receive, as input from notification client module 22, graphical information (e.g., text data, images data, etc.) based on the notification data that notification client module 22 receives. Additionally, UI module 20 may receive instructions associated with the graphical information from notification client module 22 for presenting the graphical information as one of graphical indications 16 within user interface 14. Based on the graphical information and the instructions received from notification client module 22, UI module 20 may cause UID 12 to present graphical indications 16 within user interface 14 to alert a user of computing device 10 of the receipt of notification data associated with each of graphical indications 16. In addition, UI module 20 may cause output devices 46 to output an audible, visual, haptic, or other type of alert notifying the user to the receipt of the notification data. UI module 20 may control the frequency and form with which such notification alters are output to the user.

In accordance with techniques of this disclosure, notification client module 22 of computing device 10 may receive, at time T1, first notification data. For example, at time T1, notification client module 22 of computing device 10 may receive the first notification data from information server system 60 via network 30. In the example of FIG. 1, the first notification data may be data associated with the text message associated with graphical indication 16A, which includes the message "Have you left yet?" from Allison.

Responsive to receiving the first notification data, UI module 20 of computing device 10 may output, at a first intensity level, a first alert associated with the first notification data. For instance, responsive to notification client module 22 receiving the first notification data from information server system 60, UI module 20 may receive an instruction from notification client module 22 to output an alert indicative of the text message associated with graphical indication 16A. UI module 20 may utilize output devices 46 to output a first alert associated with the text message associated with graphical indication 16A. The first alert may be one of an audible alert (e.g., a tone output via a speaker of computing device 10), a visual alert (e.g., a flashing of a light of computing device 10), or a tactile alert (e.g., a vibration of computing device 10). Further, the first alert may be at a first intensity level (e.g., a particular volume of an audio alert, a particular brightness of a visual alert, or a particular pulse velocity/pulse acceleration/pulse expansion/pulse frequency/intensity of a vibration). In the example of FIG. 1, the first alert may be an audible alert that is output at a volume equal to 80% of the maximum volume level for computing device 10.

Later, at time T2, which is after time T1, notification client module 22 of computing device 10 may receive second notification data. For example, at time T2, notification client module 22 of computing device 10 may receive the second notification data from information server system 60 via network 30. In the example of FIG. 1, the second notification data may be data associated with the text message associated with graphical indication 16B, which includes the message "If not, can you stop at the store and grab some milk?" from Allison.

Upon receiving an instruction from notification client module 22 for outputting an alert based on the second notification data, UI module 20 may determine whether the output of such an alert would be proper and if so, in what form, given that a first alert was output at time T1. UI module 20 may determine whether an indication of user interaction with computing device 10 was received between time T1 and time T2. UI module 20 may determine that any action taken by the user between times T1 and T2 as being a user interaction with computing device 10. For instance, UI module 20 may detect a movement of computing device 10, a touch input at a presence-sensitive input component of UID 12 of computing device 10, a user input to unlock computing device 10, switching a state of a switch operably connected to computing device 10, movement of an eye viewing UID 12 operably connected computing device 10, or any other input from, or action taken by, the user as a user interaction.

In the example of FIG. 1, the indication of user interaction may be a touch input at a presence-sensitive input component of UID 12 of computing device 10. In some examples, UI module 20 may determine that any touch input at the presence-sensitive input component of UID 12 of computing device 10 is a user interaction with computing device 10.

In some examples, UI module 20 may utilize artificial intelligence, machine learning, or other rules based systems to determine a set of reference characteristics of user inputs that typically indicate whether a user interaction is a deliberate user interaction. For example, UI module 20 may compare characteristics of a received touch input at the presence-sensitive input component of UID 12 to one or more reference characteristics of typical deliberate touch inputs, and determine, based on the comparison, whether the received touch input was deliberate or not. If UI module 20 determines that the characteristics of the received touch input are within a threshold error of the reference characteristics (e.g., a difference between the two sets of characteristics is less than a threshold error value), UI module 20 may determine that a deliberate, indication of user interaction with computing device 10 was received. Conversely, if UI module 20 determines that the characteristics of the received touch input are above the threshold error of the reference characteristics (e.g., a difference between the two sets of characteristics is greater than the threshold error value), UI module 20 may determine that no indication, at least no deliberate indication, of user interaction with computing device 10 was received.

The reference characteristics may be static reference characteristics. In other examples, UI module 20 may utilize machine learning to analyze how a particular user interacts with computing device 10 and adjust the reference characteristics over time to better match characteristics of deliberate interactions of that particular user. For instance, UI module 20 may detect that a user typically uses higher force when interacting with computing device 10 using touch inputs. In such an example, UI module 20 may update the reference characteristics to reflect that a higher force is typically used during interactions and any inputs that do not satisfy the higher force may be treated as unintentional or not deliberate. Conversely, if UI module 20 detects that the user typically uses less force when interacting with computing device 10 using touch inputs, UI module 20 may update the reference characteristics to reflect the lesser force typically used during interactions. In other examples, UI module 20 may send the user data to a second computing device, such as a server device, that may update the reference characteristics separately from computing device 10. The server device may then send the updated reference characteristics back to computing device 10, which in turn utilizes the updated reference characteristics in future determinations of whether the user has interacted with computing device 10.

Responsive to UI module 20 receiving the indication of user interaction with computing device 10 between time T1 and time T2, UI module 20 of computing device 10 may output, at the first intensity level, a second alert associated with the second notification data. For instance, UI module 20 may determine that computing device 10 received an indication of a touch input on a presence-sensitive input component of UID 12 of computing device 10 at some point between time T1 and time T2. As such, responsive to receiving the second notification data from information server system 60, UI module 20 may utilize output device 46 to output a second alert associated with the text message associated with graphical indication 16B at the same intensity as the first alert (i.e., an audio alert outputted at a volume equal to 80% of the maximum volume of computing device 10).

Conversely, responsive to UI module 20 determining that computing device 10 did not receive the indication of user interaction between time T1 and time T2, UI module 20 of computing device 10 may either output, at a second intensity level that is less than the first intensity level, the second alert associated with the second notification data or refrain from outputting the second alert entirely. If the user does not interact with computing device 10 after receiving the text message associated with graphical indication 16A, UI module 20 may determine that the user is likely already aware that a new communication has been received that requires their attention but for some reason (e.g., they may be distracted, in a meeting, in a conversation, otherwise unable or unwilling to view the new communication) the user has not yet seen the newly received communication. As such, when computing device 10 receives the text message associated with graphical indication 16B before the user has interacted with computing device 10, UI module 20 may determine that outputting a second alert at full intensity may be superfluous given that the user, although potentially aware that a new text message was received, may be busy preforming other tasks and may not have had a chance to view the new text message. As such, if computing device 10 receives a subsequent text message before computing device 10 detects user interactions, UI module 20 may treat a subsequent alert to the subsequent text message as being superfluous and either refrain from outputting, or at least output at a lower intensity, an alert associated with the subsequent text message. For instance, in the example of FIG. 1, UI module 20 of computing device 10 may refrain from outputting an audio alert via output device 46 upon the receipt of the second notification data. In other instances, UI module 20 of computing device 10 may output the second alert via output device 46 at a second intensity less than the first intensity. For instance, the second alert may be an audio alert output via output device 46 at a volume equal to 20% of the maximum volume of computing device 10.

In this manner, computing device 10 may alert a user of computing device 10 as to the receipt of new notification data without overwhelming, distracting, or annoying the user by unnecessarily outputting an alert each time that new notification data is received. By selectively outputting alerts based on user interactions in this way, computing device 10 may output fewer alerts by only outputting alerts that are likely to be necessary to gain the attention of a user as opposed to universally outputting alerts each time notification data is received. Responsive to outputting fewer alerts, computing device 10 may receive fewer inputs from a user interacting with the computing device (e.g., to silence or otherwise inhibit frequent and/or numerous alerts) and may perform fewer operations (e.g., the output of the audio or visual alert or the vibration of the computing device), thereby consuming less electrical power.

Figure 2:
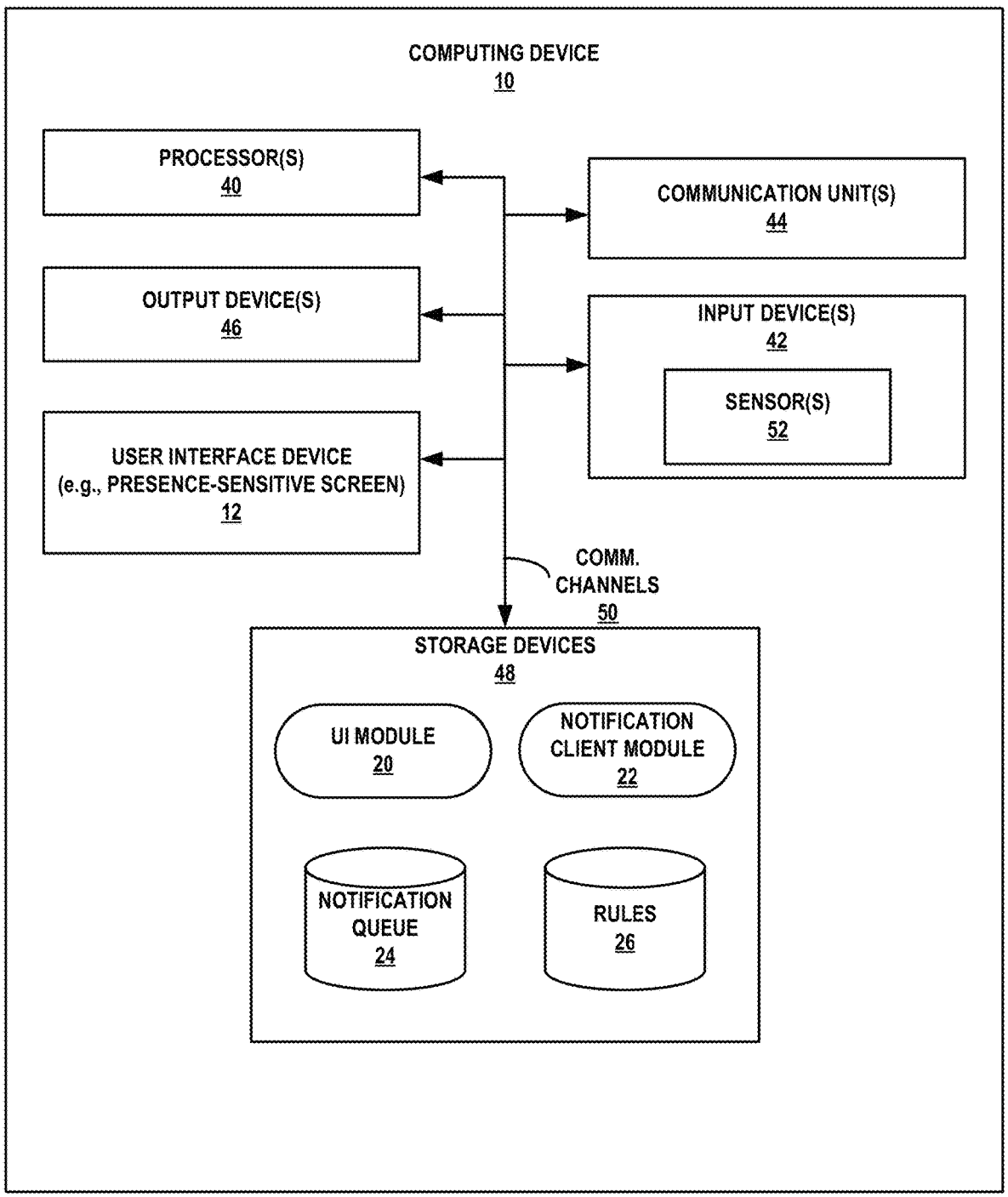
FIG. 2 is a block diagram illustrating an example computing device configured to output alerts associated with notification data based at least in part on user interactions with the example computing device, in accordance with one or more aspects of the present disclosure.

FIG. 2 is a block diagram illustrating an example computing device 10 configured to output alerts associated with notification data based at least in part on user interactions with the example computing device 10, in accordance with one or more aspects of the present disclosure. Computing device 10 of FIG. 2 is described below within the context of system 1 of FIG. 1. FIG. 2 illustrates only one particular example of computing device 10 and many other examples of computing device 10 may be used in other instances. In the example of FIG. 2, computing device 10 may be a wearable computing device, a mobile computing device, or a non-portable (e.g., desktop, etc.) computing device. Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, one or more storage devices 48, and one or more sensors 52. Storage devices 48 of computing device 10 also include UI module 20, notification client module 22, notification queue 24, and machine learning rules 26. UI module 20 and notification client module 22 may rely on information stored as notification queue 24 and rules 26 at storage device 48. In other words, as is described in more detail below, notification client module 22 may be operable by processors 40 to perform read/write operations on information, stored as notification queue 24, at storage device 48. UI module 20 may then access the information stored in notification queue 24 and rules 26 to perform a function of computing device 10.

Communication channels 50 may interconnect each of the components 12, 20, 22, 24, 26, 40, 42, 44, 46, 48, and 52 for inter-component communications (physically, communicatively, and/or operatively). In some examples, communication channels 50 may include a system bus, a network connection, an inter-process communication data structure, or any other method for communicating data.

As shown in FIG. 2, computing device 10 may include one or more sensors 52 (sensors 52). Sensors 52 may include an accelerometer that generates accelerometer data. Accelerometer data may indicate an acceleration and/or a change in acceleration of computing device 10. Sensors 52 may include a gyrometer that generates gyrometer data. Gyrometer data may indicate a physical orientation and/or change in physical orientation of computing device 10. In some examples, the orientation may be relative to one or more reference points. Sensors 52 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass.

Sensors 52 may include an ambient light sensor that generates ambient light data. The ambient light data may indicate an intensity of light to which computing device 10 is exposed. Sensors 52 may include a proximity sensor that generates proximity data. Proximity data may indicate whether an object is within proximity to computing device 10. In some examples, proximity data may indicate how close an object is to computing device 10. In some examples, sensors 52 may include a clock that generates a date and time. The date and time may be a current date and time. Sensors 52 may include a pressure sensor that generates pressure data. Pressure data may indicate whether a force is applied to computing device 10 and/or a magnitude of a force applied to computing device 10. Pressure data may indicate whether a force is applied to UID 12 and/or a magnitude of a force applied to UID 12. Sensors 52 may include a video sensor that generates picture or video data. Picture or video data may be used to further sense motions of various body parts of a user or a user's surroundings, such as food or a place setting on a table in front of a user. Sensors 52 may include a global positioning system that generates location data. Sensors 52 may also include a clock that generates time data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14A or 14B of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data (e.g., notification queue 24 and rules 26) that modules 20 and 22 access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20 and 22, notification queue 24, and rules 26.

One or more processors 40 may implement functionality and/or execute instructions within computing device 10. For example, processors 40 on computing device 10 may receive and execute instructions stored by storage devices 48 that execute the functionality of UI module 20 and notification client module 22. These instructions executed by processors 40 may cause computing device 10 to determine whether to output alerts and at what intensity to output alerts based on notification data at notification queue 24 and rules 26, within storage devices 48 during program execution. Processors 40 may execute instructions of modules 20 and 22 to cause UID 12 to output alerts based on notification data for display at UID 12 as content of user interface 14A or 14B. That is, modules 20 and 22 may be operable by processors 40 to perform various actions or functions of computing device 10, for instance, causing UID 12 to present user interfaces 14A and 14B at UID 12.

Notification queue 24 represents any suitable storage medium for storing and buffering notification data. For instance, notification queue 24 may be a queue, stack, or buffer for organizing notification data received (e.g., from information server system 60 of FIG. 1) by notification module 22 over time. UI module 20 may access notification queue 24 and initiate output of an alert at varying intensities or refrain from outputting an alert based on the notification data stored at notification queue 24 and cause notification queue 24 to store information related to the output. Notification client module 22 may perform read/write operations for adding information to notification queue 24 (e.g., when notification data is received) or removing information from notification queue 24 (e.g., when UI module outputs an alert associated with the notification data or actively determines to refrain from outputting the alert).

Rules data store 26 represents any suitable storage medium for storing and buffering rules and reference characteristics that UI module 20 may access when determining whether data received from sensors 52 is an indication of user interaction. For instance, rules data store 26 may include a set of one or more reference characteristics that reflect what sensors 52 would detect if computing device 10 received an indication of user interaction, such as force measurements of a touch input at a presence-sensitive input component of UID 12 of computing device 10, a sequence of user input to unlock computing device 10, an action of switching a state of a switch operably connected to computing device 10, speed of and duration of a movement of an eye viewing UID 12 operably connected computing device 10, or any other measurement of input from, or action taken by, the user as a user interaction.

In accordance with techniques of this disclosure, notification client module 22 of computing device 10 may receive, at a first particular time, first notification data. For example, at the first particular time, notification client module 22 of computing device 10 may receive the first notification data from an information server system (e.g., information server system 60 of FIG. 1) via a network (e.g., network 30 of FIG. 1). In the example of FIG. 2, the first notification data may be data associated with a first update message associated with an application currently executing on computing device 10, such as an application for a social media network. For instance, notification module 22 may receive notification data indicating that a state within the application has changed. In such examples, the notification data may include an update message that notifies the user that the particular state has changed.

Responsive to notification client module 22 receiving the first notification data, UI module 20 of computing device 10 may output, at a first intensity level, a first alert associated with the first notification data. For instance, responsive to notification client module 22 receiving the first notification data from the information server system, UI module 20 may receive an instruction from notification client module 22 to output an alert indicative of the update message. UI module 20 may utilize output device 46 to output a first alert associated with the update message. One or more output devices 46 of computing device 10 may generate output. Examples of output are haptic, audible, and visual output. As such, the first alert may be one of an audible alert (e.g., a tone output via a speaker of computing device 10), a visual alert (e.g., a flashing of a light of computing device 10), or a haptic alert (e.g., a vibration of computing device 10). Further, the first alert may be at a first intensity level (e.g., a particular volume of an audio alert, a particular brightness of a visual alert, or a particular pulse velocity/pulse acceleration/pulse expansion/pulse frequency/intensity of a vibration). In the example of FIG. 1, the first alert may be a haptic alert that is output at an intensity equal to 90% of the maximum vibration intensity level for computing device 10.

Later, at a second particular time, which is after the first particular time, notification client module 22 of computing device 10 may receive second notification data. For example, at the second particular time, notification client module 22 of computing device 10 may receive the second notification data from the information server system via the network. In the example of FIG. 2, the second notification data may be data associated with a second update message associated with same application currently executing on computing device 10 as the first update message.

Upon receiving an instruction from notification client module 22 for outputting an alert based on the second notification data, UI module 20 may determine whether the output of such an alert would be proper and if so, in what form, given that a first alert was output at the first particular time. UI module 20 may determine whether an indication of user interaction with computing device 10 was received between the first particular time and the second particular time. UI module 20 may determine that any action taken by the user between the first particular time and the second particular time as being a user interaction with computing device 10. For instance, UI module 20 may detect a movement of computing device 10, a touch input at a presence-sensitive input component of UID 12 of computing device 10, a user input to unlock computing device 10, switching a state of a switch operably connected to computing device 10, movement of an eye viewing UID 12 operably connected computing device 10, or any other input from, or action taken by, the user as a user interaction.

In the example of FIG. 2, the indication of user interaction may be a movement of computing device 10. In some examples, UI module 20 may determine that any movement of computing device 10 is a user interaction with computing device 10. In other examples, UI module 20 may utilize machine learning rules 26 to determine one or more reference characteristics for a deliberate movement of computing device 10. UI module 20 may compare characteristics of a received movement to the one or more reference characteristics of typical, deliberate movements, and determine, based on the comparison, whether the received movement of computing device 10 was a deliberate movement of computing device 10 in order for the user to purposefully interact with computing device 10 in response to the first alert or not. For instance, in examples where computing device 10 is a mobile phone, rules 26 may store a set of reference characteristics that reflect what sensors 52 would detect if computing device 10 was removed from a user's pocket and moved to a point where the user could view computing device 10. In another instance, in examples where computing device 10 is a smart watch device, rules 26 may store a set of reference characteristics that reflect what sensors 52 would detect if computing device 10 was attached to a user's wrist and moved to a point where the user could view computing device 10. UI module 20 may compare the characteristics detected and measured by sensors 52 to the reference characteristics in rules 26 to determine whether the indication of user input was an indication of a deliberate user input or an indication of an unintentional user input.

If UI module 20 determines that the characteristics of the received movement are within a threshold error of the reference characteristics (e.g., a difference between the two sets of characteristics is less than a threshold error value), UI module 20 may determine that a deliberate indication of user interaction with computing device 10 was received. Conversely, if UI module 20 determines that the characteristics of the received touch input are above the threshold error of the reference characteristics (e.g., a difference between the two sets of characteristics is greater than the threshold error value), UI module 20 may determine that no indication, or at least no deliberate indication, of user interaction with computing device 10 was received.

The reference characteristics may be static reference characteristics. In other examples, UI module 20 may utilize machine learning to analyze how a particular user interacts with computing device 10 and adjust the reference characteristics over time to better match characteristics of deliberate interactions from that particular user. For instance, UI module 20 may detect that the user typically moves computing device 10 in large motion arcs when interacting with computing device 10 using touch inputs. In such an example, UI module 20 may update the reference characteristics to reflect that larger movements are typically used during interactions and any inputs that do not satisfy the larger movements may be treated as unintentional or not deliberate. Conversely, if UI module 20 detects that the user typically moves computing device 10 very little while interacting with computing device 10, UI module 20 may update the reference characteristics to reflect the smaller movements typically used during interactions.

Responsive to UI module 20 receiving the indication of user interaction with computing device 10 between the first particular time and the second particular time, UI module 20 of computing device 10 may output, at the first intensity level, a second alert associated with the second notification data. For instance, UI module 20 may determine that computing device 10 received an indication of a movement of computing device 10 at some point between the first particular time and the second particular time. As such, responsive to receiving the second notification data from the information server system, UI module 20 may utilize output device 46 to output a second alert associated with the second update message at the same intensity as the first alert (i.e., a haptic alert outputted at an intensity equal to 90% of the maximum vibration intensity of computing device 10).

Conversely, responsive to UI module 20 determining that computing device 10 did not receive the indication of user interaction between the first particular time and the second particular time, UI module 20 of computing device 10 may either output, at a second intensity level that is less than the first intensity level, the second alert associated with the second notification data or refrain from outputting the second alert entirely. If the user does not interact with computing device 10 after receiving the first update message, UI module 20 may determine that the user is likely already aware that a new communication has been received that requires their attention but for some reason (e.g., they may be distracted, in a meeting, in a conversation, otherwise unable or unwilling to view the new communication) the user has not yet seen the newly received communication. As such, when computing device 10 receives the second update message before the user has interacted with computing device 10, UI module 20 may determine that outputting a second alert at full intensity may be superfluous given that the user, although potentially aware that a new update message was received, may be busy preforming other tasks and may not have had a chance to view the new update message. As such, if computing device 10 receives a subsequent update message before computing device 10 detects user interactions, UI module 20 may treat a subsequent alert to the subsequent update message as being superfluous and either refrain from outputting, or at least output at a lower intensity, an alert associated with the subsequent update message. For instance, in the example of FIG. 2, UI module 20 of computing device 10 may refrain from outputting a haptic alert via output device 46 upon the receipt of the second notification data. In other instances, UI module 20 of computing device 10 may output the second alert via output device 46 at a second intensity less than the first intensity. For instance, the second alert may be a haptic alert output via output device 46 at an intensity equal to 15% of the maximum vibration intensity of computing device 10.

In some examples, the notification data may include a type attribute that specifies the type of notification data. Types of notification data may include a message type notification data, an application type, a calendar type, an event type, a promotion type, etc. UI module 20 may further determine an intensity to output alerts for notification based on the type of notification (e.g., greater for some types of notification data and shorter for other types of notification data).

For instance, UI module 20 may determine that the first notification data has a first notification type (i.e., an update message from a particular application). UI module 20 may further determine that the second notification data has a second notification type. Responsive to the first notification type being a same notification type as the second notification type (i.e., the second notification type is also an update message from the particular application), UI module 20 may continue to analyze whether sensors 52 detected a user interaction. In other words, responsive to receiving the indication of user interaction with the computing device between the first particular time and the second particular time, UI module 20 may output the second alert at the first intensity level. Responsive to not receiving the indication of user interaction with the computing device between the first particular time and the second particular time, UI module 20 may either output, at the second intensity level that is less than the first intensity level, the second alert associated with the second notification data or refrain from outputting the second alert entirely.

Conversely, if the first and second notification types are different notification types, UI module 20 may output the second alert without consideration of user interaction. For instance, notification client module 22 may receive, at a third particular time after the first particular time, a third notification data, such as a text message. UI module 20 may determine a third notification type for the third notification data (i.e., UI module 20 may determine that the third notification type is a text message). Since the text message is not the same notification type as the update message, UI module 20 may output a third alert associated with the third notification data at the initial first intensity level.

Once notification data for each of two notification types have been received, UI module may alter the output of alerts for any subsequent notification data for both of the two notification types. For instance, notification client module 22 may receive, at a fourth particular time after the third particular time, fourth notification data, such as a second text message. UI module 20 may determine a fourth notification type for the fourth notification data (i.e., UI module 20 may determine that the fourth notification type is a text message). Given that UI module 20 has already processed notification data with the same notification type as the fourth notification type, UI module 20 may determine whether an indication of user interaction was received between the third particular time (i.e., the time at which the first instance of notification data was received that was the same notification type as the current instance) and the fourth particular time. If UI module 20 received an indication of user interaction between the third particular time and the fourth particular time, UI module 20 may output a fourth alert associated with the fourth notification data at the first intensity level. Otherwise, if UI module 20 did not receive an indication of user interaction between the third particular time and the fourth particular time, UI module 20 may either output the fourth alert associated with the fourth notification data at the second, reduced intensity level or refrain from outputting the fourth alert entirely.

In determining the intensity level at which to output the second alert, UI module 20 may further consider the time between the first particular time and the second particular time. For instance, if the difference between the first particular time and the second particular time is greater than a threshold time, such as five minutes, UI module 20 may output the second alert at the first intensity regardless of whether UI module 20 received an indication of user interaction. Otherwise, if the difference between the first particular time and the second particular time is less than the threshold time, UI module 20 may either output the second alert at the second, reduced intensity or refrain from outputting the second alert entirely. The threshold time may also be longer than five minutes, such as ten minutes or thirty minutes, or shorter than five minutes, such as three minutes. Five minutes is merely one example of a possible threshold time that could be used for such determinations.

In addition to including information about a specific event, such as the various events described above, notification data may include various attributes or parameters embedded within the notification data that specify various characteristics of the notification data. For example the notification data may include a portion of data (e.g., a bit, metadata, a field, etc.) that specifies the origin of the notification data (e.g., the platform, application, and/or service that generated the notification data).

In some examples, the notification data may include a "priority rating" attribute assigned to the notification data by the notification service and/or the origin of the notification data. The priority rating may specify time of day for outputting, or a threshold amount of time to delay outputting an alert indicative of the receipt of the notification. For example, notification client module 22 may receive notification data and determine both the priority rating assigned to the notification data and the origin of the notification data when writing the notification data to notification queue 24. UI module 20 of computing device 10 may cause computing device 10, or a component of thereof, to output a specific alert associated with the notification data (e.g., to indicate the receipt of the notification data to a user of computing device 10) at a certain time of day, based on the priority rating, or within a certain amount of time, based on the priority rating, after receiving the notification data.

Figure 3:
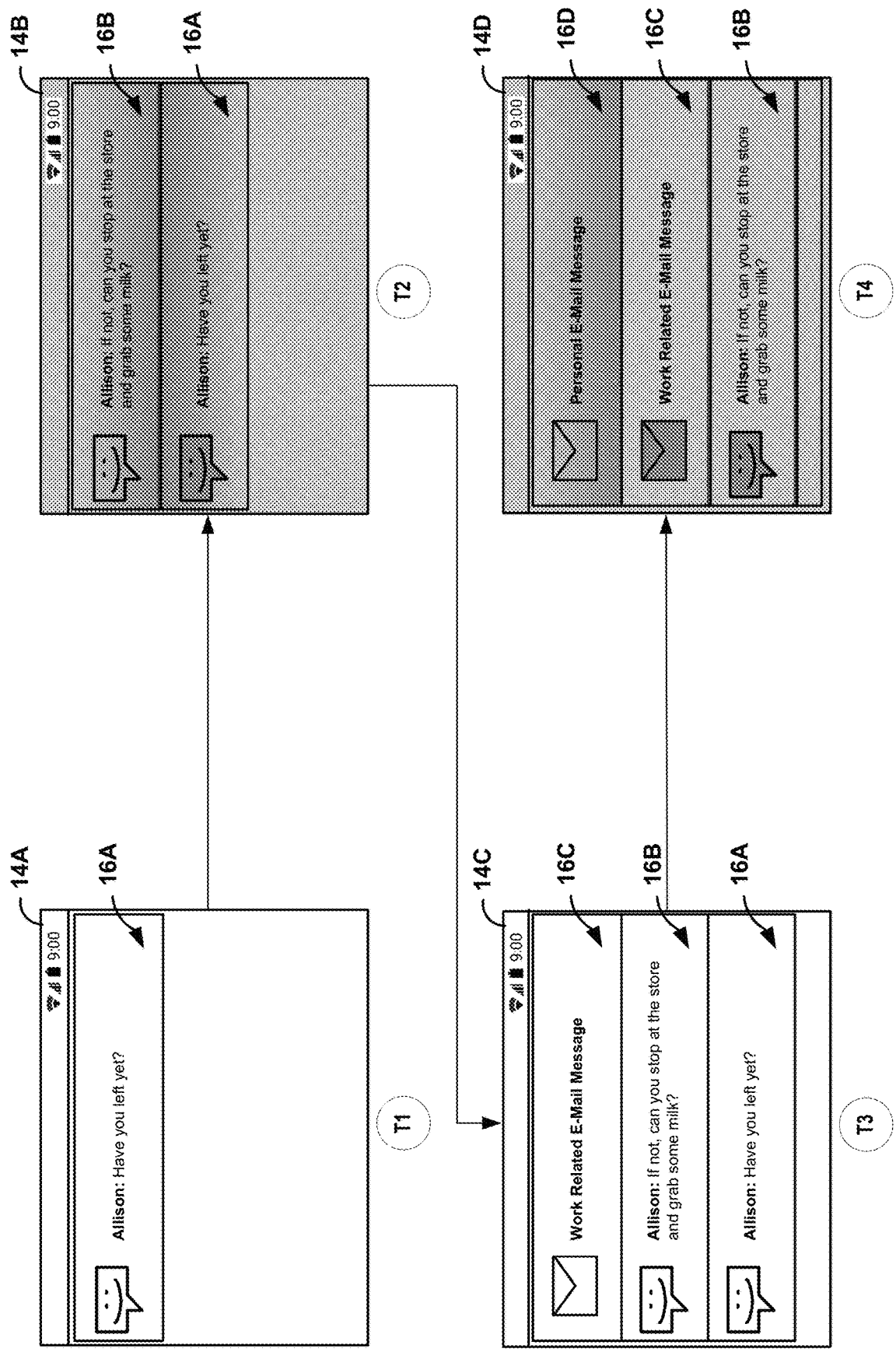
FIG. 3 is a timing diagram illustrating timing characteristics of an example computing device configured to output alerts associated with notification data based at least in part on user interactions with the example computing device, in accordance with one or more aspects of the present disclosure.

FIG. 3 is a timing diagram illustrating timing characteristics of an example computing device configured to output alerts associated with notification data based at least in part on user interactions with the example computing device and notification types, in accordance with one or more aspects of the present disclosure. FIG. 3 is described below within the context of system 1 of FIG. 1 and computing device 10 of FIG. 2. FIG. 3 illustrates a period of time that starts at T1 and ends at T4 during which computing device 10 receives notification data and outputs alerts at varying intensities based on the notification data and whether computing device 10 has received.

User interfaces 14A-14D (collectively, user interfaces 14) are example graphical user interfaces for presenting one or more graphical indications of notification data received by computing device 10 on UID 12, such as a lock screen of a mobile phone. User interface 14 includes graphical indications 16A-16D (collectively referred to herein as "graphical indications 16"). Each of graphical indications 16 corresponds to an alert being outputted by computing device 10 in response to notification data received at computing device 10. Graphical indication 16A represents a visual alert indicative of the receipt of notification data associated with a first text message. Graphical indication 16B represents a visual alert indicative of the receipt of notification data associated with a second text message. Graphical indication 16C represents a visual alert indicative of the receipt of notification data associated with a business or work related email. Graphical indication 16D represents a visual alert indicative of the receipt of notification data associated with a personal email message from a contact in an electronic address book of computing device 10.

At time T1, notification client module 22 may receive notification data associated with a first text message. UI module 20 may determine that the first text message is associated with the first notification data receives since UI module 20 last received an indication of user interaction. As such, UI module 20 may output graphical indication 16A as a first alert with a first intensity. For instance, the first alert may be a visual alert, such as the output of graphical indication 16A onto the lock screen of user interface 14A. The first intensity of the first alert may be measured as a brightness of UID 12. In the example of FIG. 3, the first intensity may be maximum brightness.

At time T2, notification client module 22 may receive notification data associated with a second text message. UI module 20 may determine whether an indication of user interaction was received between time T1 and time T2. For instance, the indication of user interaction UI module 20 attempts to detect may be a movement of an eye viewing UID 12. In some examples, sensors within computing device 10, such as a camera or other similar device operably connected to computing device 10 (e.g., embedded in computing device 10 above UID 12), may use facial recognition to determine whether a human face is within a viewing range of computing device 10. If the sensors detect a human face within viewing range, the sensors may recognize an eye in that human face and UI module 20 may determine whether the eye has glanced at UID 12 and for how long the glance lasted. In some examples, UI module 20 may determine that an indication of user interaction was received if the sensors recognize an eye and UI module 20 determines that the eye glanced at UID 12. In other instances, UI module 20 may only determine that an indication of user interaction was received if the sensors recognize the eye and UI module 20 determines that the eye glanced at UID 12 for a threshold amount of time, such as 0.5 seconds or any other time determined to be sufficient for a user to consciously recognize the received alert. Otherwise, if the sensors did not detect a human face or did not detect a sufficient eye glance, UI module 20 may determine that not user interaction was received.

Responsive to UI module 20 determining that an indication of user interaction was received between time T1 and time T2, UI module 20 may output a second alert associated with the second text message at the first intensity (i.e., output graphical indication 16B in user interface 14B at a maximum brightness). In the example of FIG. 3, UI module 20 determines that no indication of user interaction was received between time T1 and time T2. As such, UI module 20 may output the second alert associated with the second text message at a second intensity less than the first intensity. For instance, UI module 20 may output graphical indication 16B in user interface 14B, but may only illuminate UID 12 to a level equal to 15% of the maximum brightness, as shown in FIG. 3. In other instances, UI module 20 may refrain from outputting the visual alert of graphical indication 16B entirely. For instance, UI module 20 may not illuminate UID 12 at all. In such instances, once UI module 20 receives an indication of user interaction, UI module 20 may proceed to output the second alert.

At time T3, notification client module 22 may receive the third notification data associated with the business or work-related email. In some instances, UI module 20 may simply proceed to determining whether an indication of user interaction was received at any point between time T1 or time T2 and time T3. In such instances, UI module 20 may output a third alert (i.e., graphical indication 16C) at either the first intensity level or the second intensity level based on such a determination.

In the example of FIG. 3, UI module 20 may determine a notification type for the third notification data. For instance, UI module 20 may determine that the notification type for the third notification data is an email. Since both of the previously received instances of notification data were text messages, UI module 20 may determine that the third notification data is the first instance of notification data received since UI module 20 last received an indication of user interaction with the notification type of an email. As such, regardless of whether an indication of user interaction was received between time T1 and T3, UI module 20 may output a third alert associated with the third notification data at the first intensity. For instance, in the example of FIG. 3, UI module 20 may output a visual alert (i.e., graphical indication 16C on user interface 14C) on UID 12 at the maximum brightness.

At time T4, notification client module 22 may receive the fourth notification data associated with the personal email. In some instances, UI module 20 may simply proceed to determining whether an indication of user interaction was received at any point between time T1, time T2, or time T3 and time T4. In such instances, UI module 20 may output a fourth alert (i.e., graphical indication 16D) at either the first intensity level or the second intensity level based on such a determination.

In the example of FIG. 3, UI module 20 may determine a notification type for the fourth notification data. For instance, UI module 20 may determine that the notification type for the fourth notification data is an email. Since UI module 20 previously received notification data with the notification type of an email, UI module 20 may determine whether UI module 20 received an indication of user interaction between time T3 and time T4. In this example, UI module 20 may determine that UI module 20 has not received any indication of user interaction between time T3 and time T4. As such, UI module 20 may output a fourth alert (i.e., graphical indication 16D) as a visual alert in user interface 14D on UID 12 at the second intensity level, or 15% of the maximum brightness of UID 12.

In other instances, the notification type of the received notification data may be narrower. For instance, rather than classifying the notification type merely based on the type of communication received, UI module 20 may classify a notification type as a type of message and the particular contact from which the notification data originates. For instance, both text messages received in the example of FIG. 3 came from the same contact (i.e., "Allison"). UI module 20 may classify a third text message that comes from a different contact (e.g., "Father") as a different notification type than the first two text messages. Similarly, UI module 20 may classify the notification data based on an address the notification data was sent to. For instance, some mobile telephones may be configured to receive communications sent to two different telephone numbers. In such instances, UI module 20 may classify text messages received by each of the two different telephone numbers as two different communication types.

Similarly, mobile devices may be configured to receive emails at two different email addresses. For instance, in the example of FIG. 3, computing device 10 may be configured to receive emails at both a work email address (e.g., the email associated with the notification data presented as graphical indication 16C) and a personal email address (e.g., the email associated with the notification data presented as graphical indication 16D). In some examples, UI module 20 may classify these two emails as having different notification types, since the emails are related to different email addresses.

In other examples, rather than communication type, UI module 20 may classify notification data based only on the contact from which the notification data originates. For instance, the two received text messages in the example of FIG. 3 both come from the same contact (i.e., "Allison). If UI module 20 determines that the personal email message associated with graphical indication 16D also comes from the same contact (i.e., "Allison), UI module 20 may classify the personal email message as having the same type as the text messages.

Figure 4:
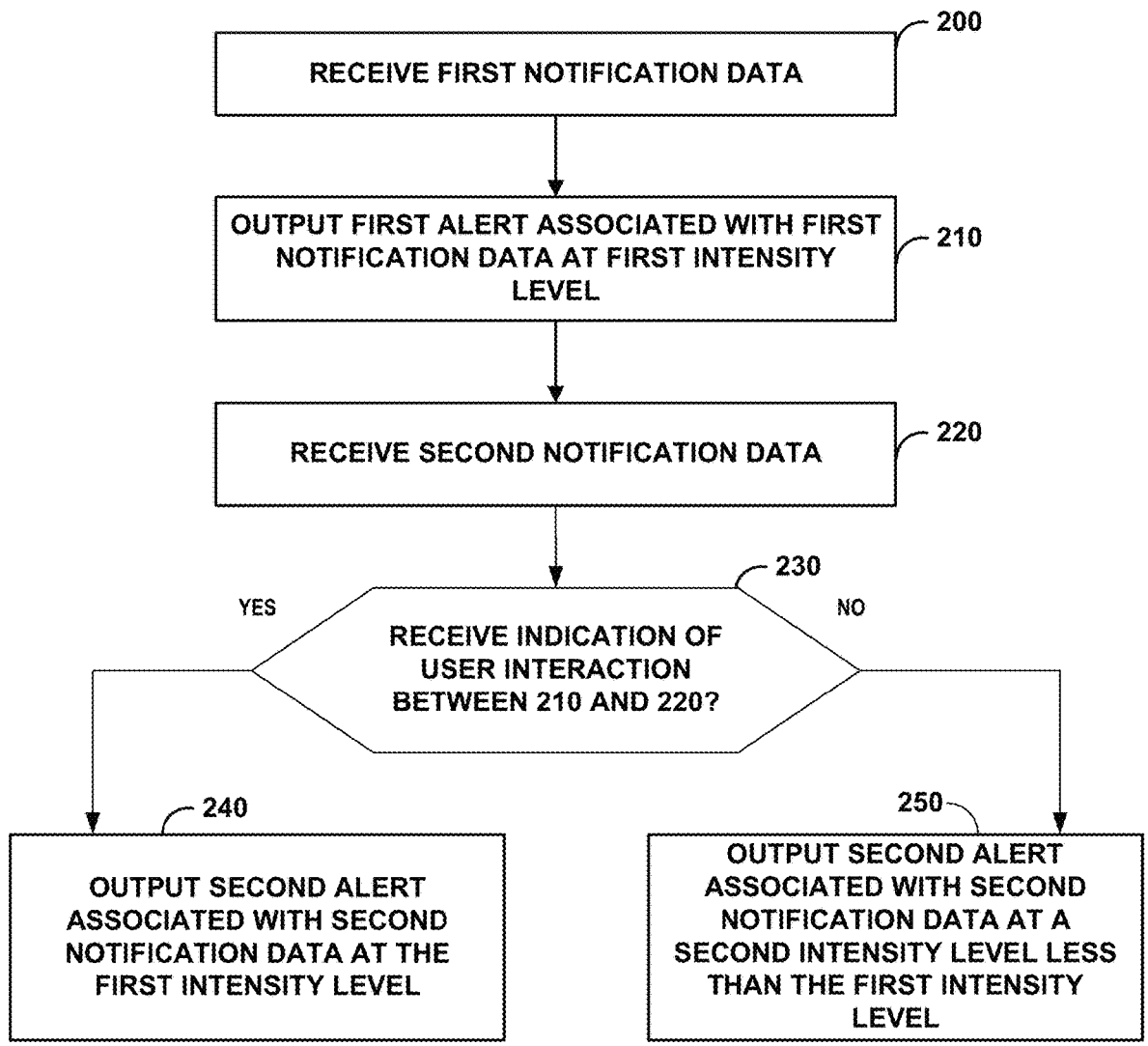
FIG. 4 is a flowchart illustrating example operations of an example computing device configured to output alerts associated with notification data based at least in part on user interactions with the example computing device, in accordance with one or more aspects of the present disclosure.

FIG. 4 is a flowchart illustrating example operations of an example computing device configured to output alerts associated with notification data based at least in part on user interactions with the example computing device, in accordance with one or more aspects of the present disclosure. The operations of computing device 10 are described within the context of system 1 of FIG. 1 and computing device 10 of FIG. 2. For example, in the example of FIG. 4, computing device 10 may be a computerized watch and information server system 60 may be a mobile phone.

In accordance with techniques of this disclosure, notification client module 22 of computing device 10 may receive, at a first particular time, first notification data (200). For example, at the first particular time, notification client module 22 of computing device 10 (e.g., a computerized watch) may receive the first notification data from information server system 60 (e.g., a mobile phone) containing a text message from information server system 60 via network 30.

Responsive to receiving the first notification data, UI module 20 of computing device 10 may output, at a first intensity level, a first alert associated with the first notification data (210). For instance, responsive to notification client module 22 receiving the first notification data from information server system 60, UI module 20 may receive an instruction from notification client module 22 to output an alert indicative of the text message. UI module 20 may utilize output device 46 to output a first alert associated with the text message. The first alert may be one of an audible alert (e.g., a tone output via a speaker of computing device 10), a visual alert (e.g., a flashing of a light of computing device 10), or a tactile alert (e.g., a vibration of computing device 10). Further, the first alert may be at a first intensity level (e.g., a particular volume of an audio alert, a particular brightness of a visual alert, or a particular pulse velocity/pulse acceleration/pulse expansion/pulse frequency/intensity of a vibration). In the example of FIG. 4, the first alert may be an audible alert that is output at a volume equal to 80% of the maximum volume level for computing device 10.

Later, at a second particular time, which is after the first particular time, notification client module 22 of computing device 10 may receive second notification data (220). For example, at the second particular time, notification client module 22 of computing device 10 may receive the second notification data that includes a second text message from information server system 60 via network 30.

Upon receiving an instruction from notification client module 22 for outputting an alert based on the second notification data, UI module 20 may determine whether the output of such an alert would be proper and, if so, in what form, given that a first alert was output at the first particular time. UI module 20 may determine whether an indication of user interaction with computing device 10 was received between the first particular time and the second particular time (230). UI module 20 may determine that any action taken by the user between the first particular time and the second particular time as being a user interaction with computing device 10. For instance, UI module 20 may detect a movement of computing device 10, a touch input at a presence-sensitive input component of UID 12 of computing device 10, a user input to unlock computing device 10, switching a state of a switch operably connected to computing device 10, movement of an eye viewing UID 12 operably connected computing device 10, or any other input from, or action taken by, the user as a user interaction.

In the example of FIG. 4, the indication of user interaction may be a touch input at a presence-sensitive input component of UID 12 of computing device 10. In some examples, UI module 20 may determine that any touch input at the presence-sensitive input component of UID 12 of computing device 10 is a user interaction with computing device 10.

In other examples, UI module 20 may utilize artificial intelligence, machine learning, or other rules based systems to determine a set of reference characteristics of user inputs that typically indicate whether a user interaction is a deliberate user interaction. For example, UI module 20 may compare characteristics of a received touch input at the presence-sensitive input component of UID 12 to one or more reference characteristics of typical deliberate touch inputs, and determine, based on the comparison, whether the received touch input was deliberate or not. If UI module 20 determines that the characteristics of the received touch input are within a threshold error of the reference characteristics (e.g., a difference between the two sets of characteristics is less than a threshold error value), UI module 20 may determine that a deliberate indication of user interaction with computing device 10 was received. Conversely, if UI module 20 determines that the characteristics of the received touch input are above the threshold error of the reference characteristics (e.g., a difference between the two sets of characteristics is greater than the threshold error value), UI module 20 may determine that no indication, or at least no deliberate indication, of user interaction with computing device 10 was received.

The reference characteristics may be static reference characteristics. In other examples, UI module 20 may utilize machine learning to analyze how a particular user interacts with computing device 10 and adjust the reference characteristics over time to better match characteristics of deliberate interactions of that particular user. For instance, UI module 20 may detect that a user typically uses higher force when interacting with computing device 10 using touch inputs. In such an example, UI module 20 may update the reference characteristics to reflect that a higher force is typically used during interactions and any inputs that do not satisfy the higher force may be treated as unintentional or not deliberate. Conversely, if UI module 20 detects that the user typically uses less force when interacting with computing device 10 using touch inputs, UI module 20 may update the reference characteristics to reflect the lesser force typically used during interactions.

Responsive to UI module 20 receiving the indication of user interaction with computing device 10 between the first particular time and the second particular time ("YES" branch of 230), UI module 20 of computing device 10 may output, at the first intensity level, a second alert associated with the second notification data (240). For instance, UI module 20 may determine that computing device 10 received an indication of a touch input on a presence-sensitive input component of UID 12 of computing device 10 at some point between the first particular time and the second particular time. As such, responsive to receiving the second notification data from information server system 60, UI module 20 may utilize output device 46 to output a second alert associated with the text message associated with graphical indication 16B at the same intensity as the first alert (i.e., an audio alert outputted at a volume equal to 80% of the maximum volume of computing device 10).

Conversely, responsive to UI module 20 determining that computing device 10 did not receive the indication of user interaction between the first particular time and the second particular time ("NO" branch of 230), UI module 20 of computing device 10 may output, at a second intensity level that is less than the first intensity level, the second alert associated with the second notification data (250). If the user does not interact with computing device 10 after receiving the first text message, UI module 20 may determine that the user is likely already aware that a new communication has been received that requires their attention but for some reason (e.g., they may be distracted, in a meeting, in a conversation, otherwise unable or unwilling to view the new communication) the user has not yet seen the newly received communication. As such, when computing device 10 receives the second text message before the user has interacted with computing device 10, UI module 20 may determine that outputting a second alert at full intensity may be superfluous given that the user, although potentially aware that a new text message was received, may be busy preforming other tasks and may not have had a chance to view the new text message. As such, if computing device 10 receives a subsequent text message before computing device 10 detects user interactions, UI module 20 may treat a subsequent alert to the subsequent text message as being superfluous and either refrain from outputting, or at least output at a lower intensity, an alert associated with the subsequent text message. For instance, in the example of FIG. 4, UI module 20 of computing device 10 may output the second alert via output device 46 at a second intensity less than the first intensity. For instance, the second alert may be an audio alert output via output device 46 at a volume equal to 20% of the maximum volume of computing device 10.

Figure 5:
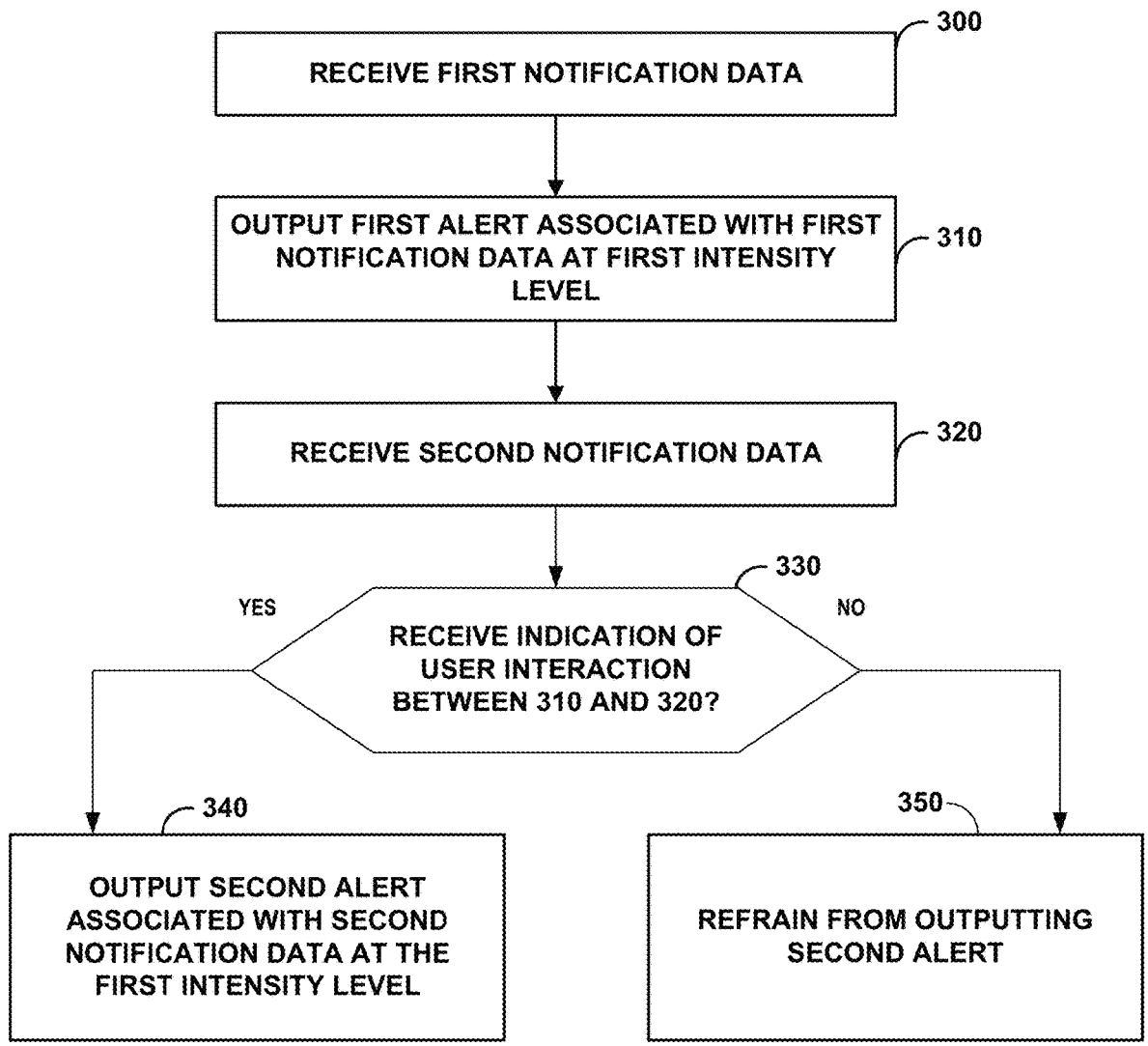
FIG. 5 is a flowchart illustrating further example operations of an example computing device configured to output alerts associated with notification data based at least in part on user interactions with the example computing device, in accordance with one or more aspects of the present disclosure.

FIG. 5 is a flowchart illustrating further example operations of an example computing device configured to output alerts associated with notification data based at least in part on user interactions with the example computing device, in accordance with one or more aspects of the present disclosure. The operations of computing device 10 are described within the context of system 1 of FIG. 1 and computing device 10 of FIG. 2.

In accordance with techniques of this disclosure, notification client module 22 of computing device 10 may receive, at a first particular time, first notification data (300). For example, at the first particular time, notification client module 22 of computing device 10 may receive the first notification data containing a text message from information server system 60 via network 30.

Responsive to receiving the first notification data, UI module 20 of computing device 10 may output, at a first intensity level, a first alert associated with the first notification data (310). For instance, responsive to notification client module 22 receiving the first notification data from information server system 60, UI module 20 may receive an instruction from notification client module 22 to output an alert indicative of the text message associated with graphical indication 16A. UI module 20 may utilize output devices 46 to output a first alert associated with the text message. The first alert may be one of an audible alert (e.g., a tone output via a speaker of computing device 10), a visual alert (e.g., a flashing of a light of computing device 10), or a tactile alert (e.g., a vibration of computing device 10). Further, the first alert may be at a first intensity level (e.g., a particular volume of an audio alert, a particular brightness of a visual alert, or a particular pulse velocity/pulse acceleration/pulse expansion/pulse frequency/intensity of a vibration). In the example of FIG. 4, the first alert may be an audible alert that is output at a volume equal to 80% of the maximum volume level for computing device 10.

Later, at a second particular time, which is after the first particular time, notification client module 22 of computing device 10 may receive second notification data (320). For example, at the second particular time, notification client module 22 of computing device 10 may receive the second notification data that includes a second text message from information server system 60 via network 30.

Upon receiving an instruction from notification client module 22 for outputting an alert based on the second notification data, UI module 20 may determine whether the output of such an alert would be proper and if so, in what form, given that a first alert was output at the first particular time. UI module 20 may determine whether an indication of user interaction with computing device 10 was received between the first particular time and the second particular time (330). UI module 20 may determine that any action taken by the user between the first particular time and the second particular time as being a user interaction with computing device 10. For instance, UI module 20 may detect a movement of computing device 10, a touch input at a presence-sensitive input component of UID 12 of computing device 10, a user input to unlock computing device 10, switching a state of a switch operably connected to computing device 10, movement of an eye viewing UID 12 operably connected computing device 10, or any other input from, or action taken by, the user as a user interaction.

In the example of FIG. 5, the indication of user interaction may be a touch input at a presence-sensitive input component of UID 12 of computing device 10. In some examples, UI module 20 may determine that any touch input at the presence-sensitive input component of UID 12 of computing device 10 is a user interaction with computing device 10.

In some examples, UI module 20 may utilize artificial intelligence, machine learning, or other rules based systems to determine a set of reference characteristics of user inputs that typically indicate whether a user interaction is a deliberate user interaction. For example, UI module 20 may compare characteristics of a received touch input at the presence-sensitive input component of UID 12 to one or more reference characteristics of typical deliberate touch inputs, and determine, based on the comparison, whether the received touch input was deliberate or not. If UI module 20 determines that the characteristics of the received touch input are within a threshold error of the reference characteristics (e.g., a difference between the two sets of characteristics is less than a threshold error value), UI module 20 may determine that a deliberate, indication of user interaction with computing device 10 was received. Conversely, if UI module 20 determines that the characteristics of the received touch input are above the threshold error of the reference characteristics (e.g., a difference between the two sets of characteristics is greater than the threshold error value), UI module 20 may determine that no indication, at least no deliberate indication, of user interaction with computing device 10 was received.

The reference characteristics may be static reference characteristics. In other examples, UI module 20 may utilize machine learning to analyze how a particular user interacts with computing device 10 and adjust the reference characteristics over time to better match characteristics of deliberate interactions of that particular user. For instance, UI module 20 may detect that a user typically uses higher force when interacting with computing device 10 using touch inputs. In such an example, UI module 20 may update the reference characteristics to reflect that a higher force is typically used during interactions and any inputs that do not satisfy the higher force may be treated as unintentional or not deliberate. Conversely, if UI module 20 detects that the user typically uses less force when interacting with computing device 10 using touch inputs, UI module 20 may update the reference characteristics to reflect the lesser force typically used during interactions.

Responsive to UI module 20 receiving the indication of user interaction with computing device 10 between the first particular time and the second particular time ("YES" branch of 330), UI module 20 of computing device 10 may output, at the first intensity level, a second alert associated with the second notification data (340). For instance, UI module 20 may determine that computing device 10 received an indication of a touch input on a presence-sensitive input component of UID 12 of computing device 10 at some point between the first particular time and the second particular time. As such, responsive to receiving the second notification data from information server system 60, UI module 20 may utilize output device 46 to output a second alert associated with the text message associated with graphical indication 16B at the same intensity as the first alert (i.e., an audio alert outputted at a volume equal to 80% of the maximum volume of computing device 10).

Conversely, responsive to UI module 20 determining that computing device 10 did not receive the indication of user interaction between time the first particular and the second particular time ("NO" branch of 330), UI module 20 of computing device 10 may refrain from outputting the second alert (350). If the user does not interact with computing device 10 after receiving the text message associated with graphical indication 16A, UI module 20 may determine that the user is likely already aware that a new communication has been received that requires their attention but for some reason (e.g., they may be distracted, in a meeting, in a conversation, otherwise unable or unwilling to view the new communication) the user has not yet seen the newly received communication. As such, when computing device 10 receives the text message associated with graphical indication 16B before the user has interacted with computing device 10, UI module 20 may determine that outputting a second alert at full intensity may be superfluous given that the user, although potentially aware that a new text message was received, may be busy preforming other tasks and may not have had a chance to view the new text message. As such, if computing device 10 receives a subsequent text message before computing device 10 detects user interactions, UI module 20 may treat a subsequent alert to the subsequent text message as being superfluous and refrain from outputting an alert associated with the subsequent text message. For instance, in the example of FIG. 5, UI module 20 of computing device 10 may refrain from outputting an audio alert via output device 46 upon the receipt of the second notification data.

In this manner, computing device 10 may alert a user of computing device 10 as to the receipt of new notification data without overwhelming, distracting, or annoying the user by unnecessarily outputting an alert each time that new notification data is received. By selectively outputting alerts based on user interactions in this way, computing device 10 may output fewer alerts by only outputting alerts that are likely to be necessary to gain the attention of a user as opposed to universally outputting alerts each time notification data is received. Responsive to outputting fewer alerts, computing device 10 may receive fewer inputs from a user interacting with the computing device (e.g., to silence or otherwise inhibit frequent and/or numerous alerts) and may perform fewer operations (e.g., the output of the audio or visual alert or the vibration of the computing device), thereby consuming less electrical power.

Example 1

A method comprising: receiving, by a computing device, at a first particular time, first notification data; responsive to receiving the first notification data, outputting, by the computing device, at a first intensity level, a first alert associated with the first notification data; receiving, by the computing device, at a second particular time after the first particular time, second notification data; responsive to receiving, by the computing device, an indication of user interaction with the computing device between the first particular time and the second particular time, outputting, by the computing device, at the first intensity level, a second alert associated with the second notification data; and responsive to not receiving, by the computing device, the indication of user interaction with the computing device between the first particular time and the second particular time, outputting, by the computing device, at a second intensity level that is less than the first intensity level, the second alert associated with the second notification data.

Example 2

The method of claim 1, further comprising: determining, by the computing device, a first notification type for the first notification data; determining, by the computing device, a second notification type for the second notification data; responsive to the first notification type being a same notification type as the second notification type: responsive to receiving, by the computing device, the indication of user interaction with the computing device between the first particular time and the second particular time, outputting, by the computing device, at the first intensity level, the second alert associated with the second notification data; and responsive to not receiving, by the computing device, the indication of user interaction with the computing device between the first particular time and the second particular time, outputting, by the computing device, at the second intensity level that is less than the first intensity level, the second alert associated with the second notification data.

Example 3

The method of claim 2, further comprising: receiving, by the computing device, at a third particular time after the first particular time, third notification data; determining, by the computing device, a third notification type for the third notification data; and responsive to determining that the third notification type is different than the first notification type, outputting, by the computing device, at the first intensity level, a third alert associated with the third notification data.

Example 4

The method of claim 3, further comprising: receiving, by the computing device, at a fourth particular time after the third particular time, fourth notification data; determining, by the computing device, a fourth notification type for the fourth notification data; and responsive to determining that the third notification type is a same notification type as the fourth notification type: responsive to receiving, by the computing device, an indication of a second user interaction with the computing device between the third particular time and the fourth particular time, outputting, by the computing device, at the first intensity level, a fourth alert associated with the fourth notification data; and responsive to not receiving, by the computing device, the indication of the second user interaction with the computing device between the third particular time and the fourth particular time, outputting, by the computing device, at the second intensity level that is less than the first intensity level, the fourth alert associated with the fourth notification data.

Example 5

The method of claim 1, wherein the user interaction comprises a deliberate user interaction, and wherein the method further comprises: responsive to receiving, between the first particular time and the second particular time, an indication of an unintentional user interaction, outputting, by the computing device, at the second intensity level, the second alert associated with the second notification data.

Example 6

The method of claim 5, wherein receiving the indication of unintentional user interaction comprises: determining, by the computing device, one or more characteristics of the unintentional user interaction; comparing, by the computing device, the one or more characteristics of the unintentional user interaction to a reference characteristic, wherein the reference characteristic comprises a set of one or more measurements of the deliberate user interaction; determining, by the computing device, that the one or more characteristics are above a threshold error relative to the reference characteristic; and determining, by the computing device, that the indication of user interaction is the unintentional indication of user interaction.

Example 7

The method of claim 1, further comprising: further responsive to not receiving, between the first particular time and the second particular time, the indication of user interaction with the computing device: determining, by the computing device, a difference between the first particular time and the second particular time; responsive to determining that the difference between the first particular time and the second particular time is less than a threshold time, outputting, by the computing device, at the second intensity level, the second alert associated with the second notification data; and responsive to determining that the difference between the first particular time and the second particular time is greater than the threshold time, outputting, by the computing device, at the first intensity level, the second alert associated with the second notification data.

Example 8

The method of claim 1, wherein receiving the indication of user interaction with the computing device comprises: receiving, by the computing device, information indicative of one or more of: movement of the computing device; touch input at a presence-sensitive input component of the computing device; user input to unlock the computing device; switching a state of a switch operably connected to the computing device; and movement of an eye viewing a display component operably connected to the computing device.

Example 9

A method comprising: receiving, by a computing device, at a first particular time, first notification data; responsive to receiving the first notification data, outputting, by the computing device, a first alert associated with the first notification data; receiving, by the computing device, at a second particular time after the first particular time, second notification data; responsive to receiving, by the computing device, an indication of user interaction with the computing device between the first particular time and the second particular time, outputting, by the computing device, a second alert associated with the second notification data; and responsive to not receiving, by the computing device, the indication of user interaction with the computing device between the first particular time and the second particular time, refraining, by the computing device, from outputting the second alert.

Example 10

The method of claim 9, further comprising: determining, by the computing device, a first notification type for the first notification data; determining, by the computing device, a second notification type for the second notification data; responsive to the first notification type being a same notification type as the second notification type: responsive to receiving, by the computing device, the indication of user interaction with the computing device between the first particular time and the second particular time, outputting, by the computing device, at the first intensity level, the second alert associated with the second notification data; and responsive to not receiving, by the computing device, the indication of user interaction with the computing device between the first particular time and the second particular time, refraining, by the computing device, from outputting the second alert.

Example 11

The method of claim 10, further comprising: receiving, by the computing device, at a third particular time after the first particular time, third notification data; determining, by the computing device, a third notification type for the third notification data; and responsive to determining that the third notification type is different than the first notification type, outputting, by the computing device, at the first intensity level, a third alert associated with the third notification data.

Example 12

The method of claim 11, further comprising: receiving, by the computing device, at a fourth particular time after the third particular time, fourth notification data; determining, by the computing device, a fourth notification type for the fourth notification data; and responsive to determining that the third notification type is a same notification type as the fourth notification type: responsive to receiving, by the computing device, an indication of a second user interaction with the computing device between the third particular time and the fourth particular time, outputting, by the computing device, at the first intensity level, a fourth alert associated with the fourth notification data; and responsive to not receiving, by the computing device, the indication of the second user interaction with the computing device between the third particular time and the fourth particular time, refraining, by the computing device, from outputting the fourth alert.

Example 13

The method of claim 9, wherein the indication of user interaction comprises an indication of deliberate user interaction, and wherein the method further comprises: responsive to receiving, between the first particular time and the second particular time, an indication of an unintentional user interaction, refraining, by the computing device, from outputting the second alert.

Example 14

The method of claim 13, wherein receiving the indication of unintentional user interaction comprises: determining, by the computing device, one or more characteristics of the unintentional user interaction; comparing, by the computing device, the one or more characteristics of the unintentional user interaction to a reference characteristic, wherein the reference characteristic comprises a set of one or more measurements of the deliberate user interaction; determining, by the computing device, that the one or more characteristics are above a threshold error relative to the reference characteristic; and determining, by the computing device, that the indication of user interaction is the unintentional indication of user interaction.

Example 15

The method of claim 9, further comprising: further responsive to not receiving, between the first particular time and the second particular time, the indication of user interaction with the computing device: determining, by the computing device, a difference between the first particular time and the second particular time; responsive to determining that the difference between the first particular time and the second particular time is less than a threshold time, refraining, by the computing device, from outputting the second alert; and responsive to determining that the difference between the first particular time and the second particular time is greater than the threshold time, outputting, by the computing device, at the first intensity level, the second alert associated with the second notification data.

Example 16

The method of claim 9, wherein receiving the indication of user interaction with the computing device comprises: receiving, by the computing device, information indicative of one or more of: movement of the computing device; touch input at a presence-sensitive input component of the computing device; user input to unlock the computing device; switching a state of a switch operably connected to the computing device; and movement of an eye viewing a display component operably connected to the computing device.

Example 17

A computing system comprising: at least one processor; and at least one module operable by the at least one processor to: receive at a first particular time, first notification data; responsive to receiving the first notification data, output at a first intensity level, a first alert associated with the first notification data; receive, at a second particular time after the first particular time, second notification data; responsive to receiving an indication of user interaction with the computing device between the first particular time and the second particular time, output, at the first intensity level, a second alert associated with the second notification data; and responsive to not receiving the indication of user interaction with the computing device between the first particular time and the second particular time, output, at a second intensity level that is less than the first intensity level, the second alert associated with the second notification data.

Example 18

The computing system of claim 17, wherein the second intensity level comprises a minimum intensity level.

Example 19

The computing system of claim 17, wherein the at least one module is further operable by the at least one processor to: determine a first notification type for the first notification data; determine a second notification type for the second notification data; responsive to the first notification type being a same notification type as the second notification type: responsive to receiving the indication of user interaction with the computing device between the first particular time and the second particular time, output, at the first intensity level, the second alert associated with the second notification data; and responsive to not receiving the indication of user interaction with the computing device between the first particular time and the second particular time, output, at the second intensity level that is less than the first intensity level, the second alert associated with the second notification data.

Example 20

The computing system of claim 17, wherein the at least one module is further operable by the at least one processor to: receive, at a third particular time after the first particular time, third notification data; determine, a third notification type for the third notification data; responsive to determining that the third notification type is different than the first notification type, output, at the first intensity level, a third alert associated with the third notification data; receive, at a fourth particular time after the third particular time, fourth notification data; determine a fourth notification type for the fourth notification data; and responsive to determining that the third notification type is a same notification type as the fourth notification type: responsive to receiving an indication of a second user interaction with the computing device between the third particular time and the fourth particular time, output, at the first intensity level, a fourth alert associated with the fourth notification data; and responsive to not receiving the indication of the second user interaction with the computing device between the third particular time and the fourth particular time, output, at the second intensity level that is less than the first intensity level, the fourth alert associated with the fourth notification data.

Example 21

A computing device configured to perform any of the methods of examples 1-16.

Example 22

A computing device comprising means for performing any of the methods of examples 1-16.

Example 23

A computer-readable storage medium encoded with instructions for causing one or more programmable processors to perform any of the methods or examples 1-16.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
    receiving, by a computing device, at a first particular time, first notification data indicative of a first event within an execution environment at the computing device;
    responsive to receiving the first notification data, outputting, by the computing device, a first audible alert associated with the first notification data;
    receiving, by the computing device, at a second particular time after the first particular time, second notification data indicative of a second event within the execution environment at the computing device, wherein the second event is different than the first event, and wherein the second notification data is different than the first notification data;
    responsive to receiving, by the computing device, an indication of user interaction with the computing device between the first particular time and the second particular time, outputting, by the computing device, a second audible alert associated with the second notification data; and
    responsive to not receiving, by the computing device, the indication of the user interaction with the computing device between the first particular time and the second particular time, outputting, by the computing device, a third audible alert associated with the second notification data, wherein the third audible alert is different than each of the second audible alert and the first audible alert.

2. The method of claim 1, wherein the first notification data and the second notification data originate from a common contact.

3. The method of claim 2, further comprising:
storing, by the computing device and in an address book, information associated with the common contact.

4. The method of claim 1, wherein the third audible alert indicates a receipt of the second notification data.

5. The method of claim 1, wherein receiving the indication of the user interaction with the computing device comprises receiving, by the computing device, information indicative of one or more of:
a movement of the computing device;
a touch input at a component of the computing device;
a user input to unlock the computing device;
a switching of a state of a switch operably connected to the computing device; or
a movement of an eye viewing a display component operably connected to the computing device.

6. The method of claim 1,
wherein outputting the first audible alert comprises outputting, by the computing device, the first audible alert at a particular volume level, and
wherein outputting the second audible alert comprises outputting, by the computing device, the second audible alert at the particular volume level.

7. The method of claim 1, further comprising:
determining, by the computing device, a first notification type for the first notification data;
determining, by the computing device, a second notification type for the second notification data; and
responsive to determining the first notification type is a same notification type as the second notification type:
responsive to receiving, by the computing device, the indication of the user interaction with the computing device between the first particular time and the second particular time, outputting, by the computing device, the second audible alert associated with the second notification data; and
responsive to not receiving, by the computing device, the indication of the user interaction with the computing device between the first particular time and the second particular time, refraining, by the computing device from outputting the second audible alert.

8. The method of claim 7, further comprising:
receiving, by the computing device, at a third particular time after the first particular time, third notification data indicative of a third event within the execution environment at the computing device, the third event being different than each of the first event and the second event;
determining, by the computing device, a third notification type for the third notification data; and
responsive to determining that the third notification type is different than the first notification type, outputting, by the computing device, another audible alert associated with the third notification data.

9. The method of claim 1, wherein the user interaction comprises a deliberate user interaction, and wherein the method further comprises:
responsive to receiving, between the first particular time and the second particular time, an indication of an unintentional user interaction, refraining, by the computing device, from outputting the second audible alert.

10. The method of claim 9, wherein receiving the indication of the unintentional user interaction comprises:

determining, by the computing device, one or more characteristics of the unintentional user interaction;
comparing, by the computing device, the one or more characteristics of the unintentional user interaction to a reference characteristic, wherein the reference characteristic comprises a set of one or more measurements of the deliberate user interaction;
determining, by the computing device, that the one or more characteristics are above a threshold error relative to the reference characteristic; and
determining, by the computing device, that the indication of the user interaction is the unintentional indication of user interaction.

11. The method of claim 1, further comprising:
further responsive to not receiving, between the first particular time and the second particular time, the indication of the user interaction with the computing device:
determining, by the computing device, a difference between the first particular time and the second particular time;
responsive to determining that the difference between the first particular time and the second particular time is less than a threshold time, refraining, by the computing device, from outputting the second audible alert; and
responsive to determining that the difference between the first particular time and the second particular time is greater than the threshold time, outputting, by the computing device, the second audible alert.

12. The method of claim 1, wherein the third audible alert is different than the second audible alert at least due to the third audible alert being output at a different intensity level than the second audible alert.

13. A computing device, comprising:
at least one processor; and
at least one computer-readable storage media storing instructions that, when executed, cause the at least one processor to:
receive at a first particular time, first notification data indicative of a first event within an execution environment at the computing device;
responsive to receiving the first notification data, output a first audible alert associated with the first notification data;
receive, at a second particular time after the first particular time, second notification data indicative of a second event within the execution environment at the computing device, wherein the second event is different than the first event, and wherein the second notification data is different than the first notification data;
responsive to receiving an indication of user interaction with the computing device between the first particular time and the second particular time, output a second audible alert associated with the second notification data; and
responsive to not receiving the indication of the user interaction with the computing device between the first particular time and the second particular time, output a third audible alert associated with the second notification data, wherein the third audible alert is different than each of the second audible alert and the first audible alert.

14. The computing device of claim 13, wherein the first notification data and the second notification data originate from a common contact.

15. The computing device of claim 13, wherein the third audible alert indicates a receipt of the second notification data.

16. The computing device of claim 13, wherein the instructions stored on the at least one computer-readable storage media that cause the at least one processor to receive the indication of the user interaction with the computing device cause the at least one processor to receive information indicative of one or more of:
- a movement of the computing device;
- a touch input at a component of the computing device;
- a user input to unlock the computing device;
- a switching of a state of a switch operably connected to the computing device; or
- a movement of an eye viewing a display component operably connected to the computing device.

17. The computing device of claim 13, wherein the instructions stored on the at least one computer-readable storage media further cause the at least one processor to:
- determine a first notification type for the first notification data;
- determine a second notification type for the second notification data; and
- responsive to determining the first notification type is a same notification type as the second notification type:
  - responsive to receiving the indication of the user interaction with the computing device between the first particular time and the second particular time, output the second audible alert associated with the second notification data; and
  - responsive to not receiving the indication of the user interaction with the computing device between the first particular time and the second particular time, refrain from outputting the second audible alert.

18. A computer-readable storage medium storing instructions that, when executed, cause at least one processor of a computing device to:
- receive at a first particular time, first notification data indicative of a first event within an execution environment at the computing device;
- responsive to receiving the first notification data, output a first audible alert associated with the first notification data;
- receive, at a second particular time after the first particular time, second notification data indicative of a second event within the execution environment at the computing device, wherein the second event is different than the first event, and wherein the second notification data is different than the first notification data;
- responsive to receiving an indication of user interaction with the computing device between the first particular time and the second particular time, output a second audible alert associated with the second notification data; and
- responsive to not receiving the indication of the user interaction with the computing device between the first particular time and the second particular time, output a third audible alert associated with in the second notification data, wherein the third audible alert is different than each of the second audible alert and the first audible alert.

19. The computer-readable storage medium of claim 18, wherein the first notification data and the second notification data originate from a common contact.

20. The computer-readable storage medium of claim 18, wherein the third audible alert indicates a receipt of the second notification data.

* * * * *